Nov. 22, 1949 — R. O'D. JONES — 2,489,035
SHOCK ABSORBER FLUID DISPENSING AND METERING DEVICE
Filed Feb. 27, 1948
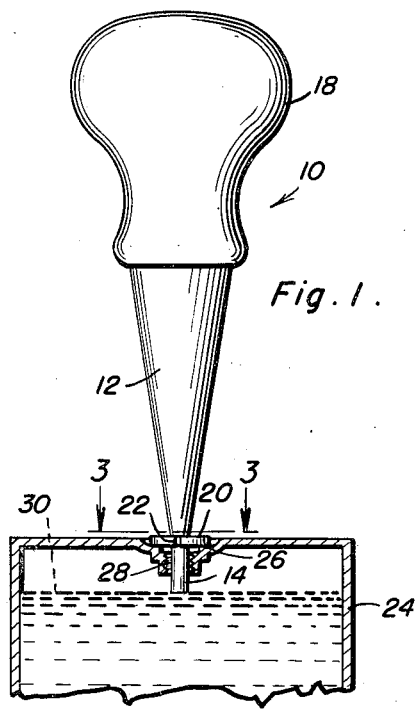
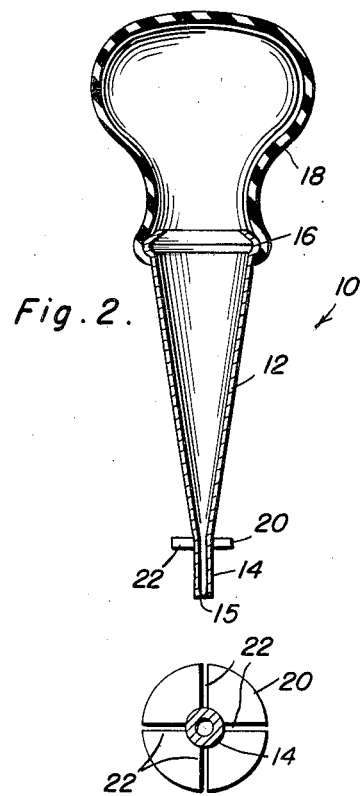
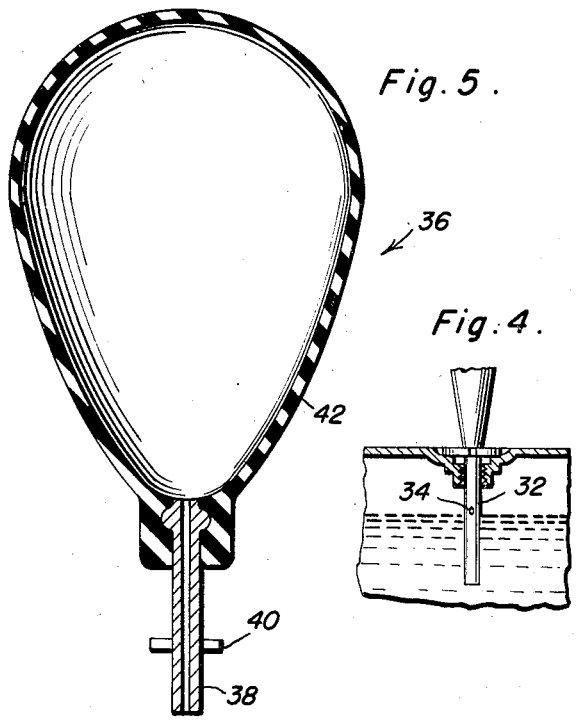
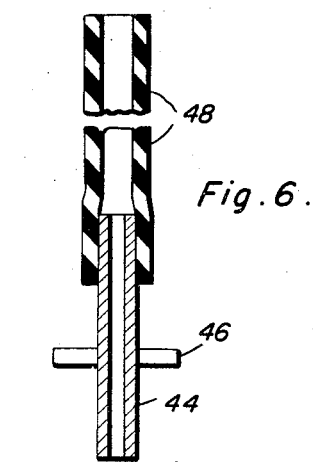
Richard O'D. Jones
INVENTOR.

Patented Nov. 22, 1949

2,489,035

UNITED STATES PATENT OFFICE 2,489,035

SHOCK ABSORBER FLUID DISPENSING AND METERING DEVICE

Richard O'D. Jones, Parsons, Kans.

Application February 27, 1948, Serial No. 11,727

1 Claim. (Cl. 222—122)

This invention relates to new and useful improvements and structural refinements in devices for filling hydraulic shock absorbers with fluid, particularly shock absorbers of the type commonly used on automobiles and similar vehicles.

The shock absorbers include a housing containing oil-like fluid, and in order to prevent the internal mechanism of the shock absorber from becoming damaged by excessive pressure or hydraulic shock, it is essential that the housing thereof not be filled completely, but only to a predetermined level. On the other hand, the presence of an insufficient amount of fluid in the shock absorber housing renders the mechanism inefficient, if not altogether ineffective. Accordingly, the necessity of filling the housing to the proper, predetermined level cannot be over emphasized, but the filling operation, particularly the measurement of the level, is, in virtually all instances, a difficult task, not only because the shock absorbers are usually mounted in poorly accessible locations, but also because nothing more than a common cup, jar or bottle is usually employed for pouring the fluid into the housing. Accordingly, no means are usually available for measuring the level of fluid in the housing, the decision as to whether or not proper level exists usually being left to the estimation or discretion of the mechanic.

It is, therefore, the principal object of the instant invention to eliminate the above outlined disadvantages and to assure not only simple, convenient and speedy filling of the shock absorber housing, but also to assure that when the filling operation is completed, the fluid in the housing will be at the proper, predetermined level.

An important feature of the invention lies not only in its ability for dispensing and measuring or metering the fluids, but also in its adaptability for checking the fluid level in order to determine whether fluid should be added or removed.

Another feature of the invention resides in the provision of what may be referred to as a shock absorber fluid dispensing and metering device which is simple in construction, which, as aforesaid, may be easily and conveniently manipulated, and which will readily lend itself to economical manufacture.

With the above more important objects and features in view and such other objects and features as may become apparent as this specification proceeds, the invention consists essentially of the arrangement and construction of parts as illustrated in the accompanying drawings, in which:

Figure 1 is a side elevational view of the invention, showing the same applied to a shock absorber housing illustrated in fragmentary cross section;

Figure 2 is a cross sectional view of the invention per se;

Figure 3 is a cross sectional view, taken substantially in the plane of the line 3—3 in Figure 1;

Figure 4 is a fragmentary elevational view, similar to that shown in Figure 1, but illustrating a modified embodiment of the invention;

Figure 5 is a cross sectional view showing a further modified embodiment; and

Figure 6 is a cross sectional view, illustrating a still further modified embodiment of the invention.

Like characters of reference are employed to designate like parts in the specification and throughout the several views.

Referring now to the accompanying drawings in detail, more particularly to Figures 1, 2 and 3, the invention consists of a shock absorber fluid dispensing and metering device designated generally by the reference character 10, the same embodying in its construction a substantially frusto-conical fluid reservoir 12, the minor end of which is formed integrally with a metering tube 14.

The major end portion of the reservoir 12 is formed with an outward, annular bead 16, whereby it is connected to a collapsible bulb 18, as will be clearly apparent.

A disk-shaped stop plate 20 is secured on the tube 14 adjacent the minor end of the reservoir 12, the stop plate 20 being formed with a series of radially extending air passages or slots 22 which may, if desired, extend completely to the outer lateral surface of the tube 14, substantially as shown.

The hydraulic shock absorber with which the invention is to be used usually includes in its construction a housing 24 provided with a depressed portion 26 surrounding a filler opening 28, the latter being screw threaded to receive a filler plug (not shown) upon removal of which fluid may be poured into or removed from the housing.

The metering tube 14 is insertable through the opening 28 in the housing 24 to a predetermined extent, the extent of this insertion being governed by the stop plate 20 which is engageable with the outer surface of the housing, more specifically, with the depression 26, and thereby limits the extent to which the metering tube may be inserted.

Accordingly, when the shock absorber is to be filled with fluid, fluid is drawn into the reservoir 12 and into the bulb 18 from a suitable container by simply compressing and thereafter permitting expansion of the bulb, whereafter by inserting the tube 14 through the opening 28 into the shock absorber housing 24 and compressing the bulb 18, the fluid will be dispensed from the reservoir 12 into the shock absorber housing.

In this manner, the filling of the shock absorber housing with fluid is effected, and after the housing has been filled to or nearly to the top, a test should be made to determine the level of the liquid. This is accomplished by simply inserting the tube 14 through the opening 28 while the reservoir 12 is empty or partially filled, the bulb 18 being compressed prior to the insertion of the tube and thereafter being permitted to expand, so that the fluid from the housing 24 will be withdrawn into the reservoir and into the collapsible bulb, if necessary. In any event, since the tube 14 extends into the housing to a predetermined depth, so to speak, fluid will not be withdrawn from below that depth or level, so that when the invention is subsequently removed from the shock absorber, the fluid in the housing 24 will be disposed at the proper, predetermined level, indicated at 30.

Needless to say, the checking of fluid level in the shock absorber housing may be effected in a similar manner.

If desired, the lower, that is, the outer end of the metering tube 14 may be provided with a restricted orifice, as at 15, in order to prevent "funneling" action within the housing 24 such as would cause air from the upper end portion of the housing 24 to gain access into the reservoir 12.

It should be pointed out at this point that in addition to its primary function as a stop, the plate 20 being provided with the slots or passages 22 also functions as a vent, as it were, facilitating the entry or exit of air into and from the housing 24, so as to displace the incoming or outgoing fluid, as the case may be.

Referring now to the accompanying Figure 4, the same illustrates a modified embodiment of the invention, wherein the metering tube 32 is somewhat longer with respect to the aforementioned tube 14, but is provided in the lateral wall thereof with one or more openings or apertures 34, the location of which on the tube determines proper level of the liquid in the shock absorber housing.

Referring now to the accompanying Figure 5, the general reference character 36 designates a further modified embodiment of the invention, wherein the metering tube 38, provided with a stop plate 40, is connected directly to a collapsible bulb 42. This structural arrangement eliminates the aforementioned fluid reservoir 12, the bulb 42 being, of course, of sufficient volume to accommodate a substantial quantity of fluid.

Finally, in the accompanying Figure 6, the reference character 44 indicates a metering tube provided with a stop plate 46, while a length of flexible hose 48 connects the tube 44 to a suitable, collapsible bulb (not shown), or to the tube 14 of a device such as is illustrated at 10. By virtue of this arrangement, the collapsible bulb is disposed remotely with respect to the metering tube, whereby the device may be easily and conveniently manipulated in obstructed or poorly accessible locations.

In any event, it should be understood that the position of the stop plate on the metering tube, or the position of the metering apertures or openings (34) on the metering tube, in any embodiment of the invention as disclosed, may be varied as desired, in order to conform to the proper, predetermined level of fluid in shock absorbers of various types and sizes.

It is believed that the advantages and use of the invention will be clearly apparent from the foregoing disclosure, and accordingly, further description thereof at this point is deemed unnecessary.

Having described the invention, what is claimed as new is:

A combined fluid dispensing and metering device for shock absorbers having a housing provided in the top wall thereof with a filler plug opening and with a circular shoulder spaced upwardly and outwardly from said opening, said device comprising a vertical tube receivable in the stated opening and projecting upwardly therefrom, a collapsible bulb mounted at the upper end of said tube, the lower end of the tube terminating in a diametrically restricted orifice, and a circular plate secured intermediate the ends of the tube and adapted to have its marginal edge portion seated on the stated shoulder, said plate being provided with a set of slots extending radially from said tube to the marginal edge of the plate, whereby the stated opening may communicate with the atmosphere.

RICHARD O'D. JONES.

REFERENCES CITED

The following references are of record in the file of this patent:

UNITED STATES PATENTS

| Number | Name | Date |
| --- | --- | --- |
| 515,587 | Hopkins | Feb. 27, 1894 |
| 672,207 | Dunn | Apr. 16, 1901 |
| 710,587 | Keuffel | Oct. 7, 1902 |
| 1,920,335 | Wood | Aug. 1, 1933 |
| 2,086,071 | Ehnts | July 6, 1937 |
| 2,252,119 | Edmonds | Aug. 12, 1941 |
| 2,427,932 | Spender et al. | Sept. 23, 1947 |